(12) United States Patent
Kim

(10) Patent No.: US 12,612,103 B2
(45) Date of Patent: Apr. 28, 2026

(54) APPARATUS AND METHOD FOR CONTROLLING OPERATION OF REACTION FORCE MOTOR

(71) Applicant: HL MANDO CORPORATION, Pyeongtaek-si (KR)

(72) Inventor: Taesik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 207 days.

(21) Appl. No.: 17/706,572

(22) Filed: Mar. 28, 2022

(65) Prior Publication Data

US 2023/0192185 A1 Jun. 22, 2023

(30) Foreign Application Priority Data

Dec. 22, 2021 (KR) ........................ 10-2021-0185006

(51) Int. Cl.
*B62D 5/04* (2006.01)
*B62D 5/00* (2006.01)
*B62D 6/00* (2006.01)

(52) U.S. Cl.
CPC .............. *B62D 6/008* (2013.01); *B62D 5/006* (2013.01); *B62D 5/0484* (2013.01); *B62D 5/0487* (2013.01)

(58) Field of Classification Search
CPC ...... B62D 5/005; B62D 5/006; B62D 5/0484; B62D 6/008
See application file for complete search history.

(56) References Cited

U.S. PATENT DOCUMENTS 8,878,474 B2 * 11/2014 Kezobo ............... H02P 29/0241
                                                      318/434
10,272,941 B2 * 4/2019 Sakamaki ............ B62D 5/0469
10,673,366 B2 * 6/2020 Suzuki .................... H02P 27/08

FOREIGN PATENT DOCUMENTS

KR 10-2020-0042600 4/2020

OTHER PUBLICATIONS

Office Action dated Mar. 9, 2026 for Korean Patent Application No. 10-2021-0185006 and its English translation by Global Dossier.

* cited by examiner

*Primary Examiner* — Gonzalo Laguarda
(74) *Attorney, Agent, or Firm* — WOMBLE BOND DICKINSON (US) LLP

(57) ABSTRACT

Disclosed are an apparatus and a method for controlling an operation of a reaction force motor. An exemplary embodiment of the present disclosure provides an apparatus for controlling an operation of a reaction force motor, which is included in a system for providing a reaction force by using the reaction force motor and an elastic member which is deformed by a rotation of a steering wheel in a direction of a rotation axis of the steering wheel, the apparatus including: a first motor control unit connected to a first winding part of the reaction force motor; and a second motor control unit connected to a second winding part of the reaction force motor, in which the first and second motor control units control turning-on or turning-off of switches included therein so that the reaction force motor generates braking torque corresponding to reaction force torque provided by the elastic member, a steering angle of the steering wheel, and steering torque of the steering wheel.

14 Claims, 15 Drawing Sheets

S710 — ANY ONE PHASE IS OPEN-CIRCUITED?

No

Yes

CONTROL TURNING-OFF OF SWITCHES OF INVERTER INCLUDING OPEN-CIRCUITED PHASE AND CONTROL TURNING-ON OF SWITCHES OF INVERTER INCLUDING NO OPEN-CIRCUITED PHASE

MAINTAINED

S720

S730

S1110 — TWO PHASES ARE SHORT-CIRCUITED?

No

Yes

S1120 — CONTROL TURNING-ON OF SWITCHES OF INVERTER INCLUDING SHORT-CIRCUITED PHASES

S1140 — MAGNITUDE OF BRAKING TORQUE ≤ PRESET MAGNITUDE ?

No

Yes

S1150 — CONTROL TURNING-ON OF SWITCHES OF INVERTER INCLUDING NO SHORT-CIRCUITED PHASES

MAINTAINED — S1130

APPARATUS AND METHOD FOR CONTROLLING OPERATION OF REACTION FORCE MOTOR

CROSS-REFERENCE TO RELATED APPLICATIONS

This application claims benefit and priority to Korean Patent Application No. 10-2021-0185006, filed on Dec. 22, 2021, with the Korean Intellectual Property Office, the disclosure of which is incorporated herein in its entirety by reference.

TECHNICAL FIELD

The present disclosure relates to an apparatus and method for controlling an operation of a reaction force motor, and particularly, to an apparatus and method for generating braking torque by using a redundant circuit structure.

BACKGROUND

The contents disclosed in this section only provide background information in respect to the present disclosure but do not constitute the prior art.

A steering assist system refers to a system that provides an appropriate sense of steering to a driver according to traveling situations so that the driver may feel the sense of steering according to a rotation of a steering wheel when the driver rotates the steering wheel (steering intention).

Examples of the steering assist system include a hydraulic power steering (HPS) system configured to provide a sense of steering by using a hydraulic pressure generated by operating a pump, and an electronic power steering (EPS) system configured to provide a sense of steering by using a reaction force generated by operating a motor. The reaction force is provided by a reaction force motor connected through a steering wheel, a column, and the like.

Recently, a steer-by-wire (SbW) system is applied, which transmits steering intention of the driver only by means of electrical connection between a steering wheel and a road wheel without mechanical connection.

The SbW system performs a steering operation by controlling the road wheel, which is connected to a steering motor, by operating the steering motor under the control of an electronic control unit (ECU) that detects the rotation of the steering wheel (steering intention).

The SbW system may include a road wheel actuator (RWA) configured to move the road wheel by transmitting the steering intention of the driver to the road wheel, a steering feedback actuator (SFA) configured to provide a reaction force of the steering wheel, and a control device. The RWA corresponds to a steering output actuator, and the SFA corresponds to a steering input actuator.

The SFA may include a steering wheel, a steering shaft, a reaction force motor, a steering angle sensor, a steering torque sensor, and the like. The steering intention of the driver may be inputted to the SFA through the steering wheel.

The reaction force motor may provide the reaction force to the steering wheel by receiving a control signal from a control device. Specifically, the reaction force motor may generate reaction force torque by being operated on the basis of the control signal provided from the control device.

The control device may receive information on the steering intention of the driver (steering information) from the SFA and output the control signal, which corresponds to the information, to the RWA. The steering information may include steering angles, steering torque, and the like.

The control device may receive feedback in respect to information on a reaction force generated by the road wheel, a change in alignment torque, and vibration from a road surface from the RWA and output the control signal, which corresponds to the feedback, to the SFA. The SFA may provide an appropriate sense of steering to the driver by generating the reaction force torque by operating the reaction force motor depending on the control signal outputted by the control device.

SUMMARY

The present disclosure has been made in an effort to provide an apparatus and a method, which may generate braking torque by using a redundant circuit structure, thereby providing braking torque with a relatively large value, increasing a heat capacity, and providing an operation robust against the occurrence of failure.

An exemplary embodiment of the present disclosure provides an apparatus for controlling an operation of a reaction force motor, which is included in a system for providing a reaction force by using the reaction force motor and an elastic member which is deformed by a rotation of a steering wheel in a direction of a rotation axis of the steering wheel, the apparatus including: a first motor control unit connected to a first winding part of the reaction force motor; and a second motor control unit connected to a second winding part of the reaction force motor, in which the first and second motor control units control turning-on or turning-off of switches included therein so that the reaction force motor generates braking torque corresponding to reaction force torque provided by the elastic member, a steering angle of the steering wheel, and steering torque of the steering wheel.

Another exemplary embodiment of the present disclosure provides a method performed by an apparatus for controlling an operation of a reaction force motor, which is included in a system for providing a reaction force by using the reaction force motor and an elastic member which is deformed by a rotation of a steering wheel in a direction of a rotation axis of the steering wheel, the apparatus including a first motor control unit connected to a first winding part of the reaction force motor, and a second motor control unit connected to a second winding part of the reaction force motor, the method including: receiving a steering angle and steering torque of the steering wheel; and controlling turning-on or turning-off of switches included in the first and second motor control units so that the reaction force motor generates braking torque corresponding to the steering angle, the steering torque, and the reaction force torque.

According to the embodiment of the present disclosure, the resistance of the motor and the control apparatus is reduced by half, and thus the circulating current increases, which makes it possible to generate further increased braking torque.

According to another embodiment of the present disclosure, it is possible to prevent heat from being repeatedly generated at a narrow point by the circulating current, thereby reducing the current load and improving the heat capacity.

According to still another embodiment of the present disclosure, the braking torque may be generated even though a failure occurs on the system, thereby providing the structure robust against a failure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
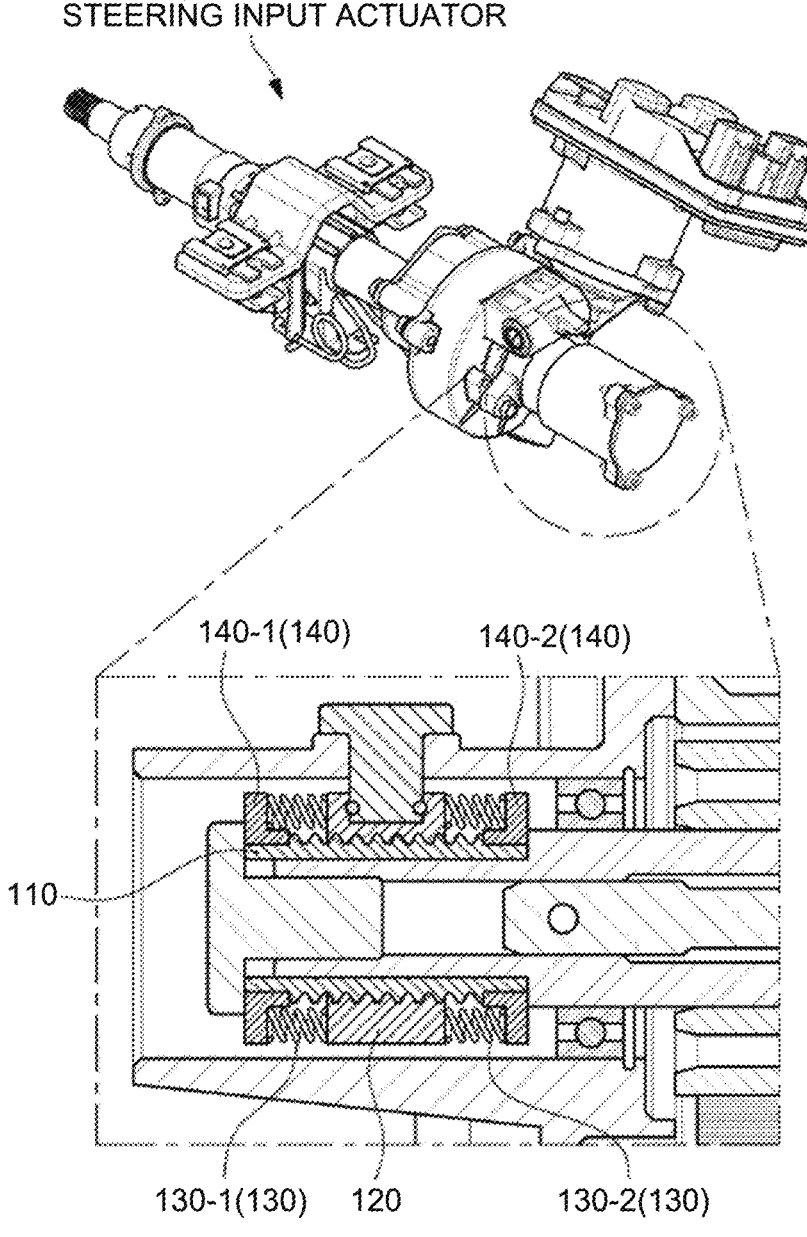
FIGS. 1A and 1B are views for explaining a stopper configured to provide a reaction force.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. In addition, in the description of the present disclosure, the specific descriptions of publicly known related configurations or functions will be omitted when it is determined that the specific descriptions may obscure the subject matter of the present disclosure.

In addition, the terms first, second, A, B, (a), and (b) may be used to describe constituent elements of the present disclosure. These terms are used only for the purpose of discriminating one constituent element from another constituent element, and the nature, the sequences, or the orders of the constituent elements are not limited by the terms. Throughout the specification, unless explicitly described to the contrary, the words "comprise" or "have" and variations such as "comprises", "comprising", "has", or "having", will be understood to imply the inclusion of stated elements but not the exclusion of any other elements. In addition, the term "unit", "part", "module", or the like, which is described in the specification, means a unit that performs at least one function or operation, and the "unit", "part", or the like may be implemented by hardware, software, or a combination of hardware and software.

A reaction force motor and a stopper disclosed in the present specification may provide a reaction force to a driver's steering intention. The reaction force motor may provide the reaction force by generating braking torque, and the stopper may provide the reaction force using tensile and compressive forces and a restoring force of an elastic member. Therefore, the stopper and the reaction force motor (an apparatus for controlling an operation of the reaction force motor) may constitute a system that provides the reaction force to the driver's steering intention.

Figure 1B:
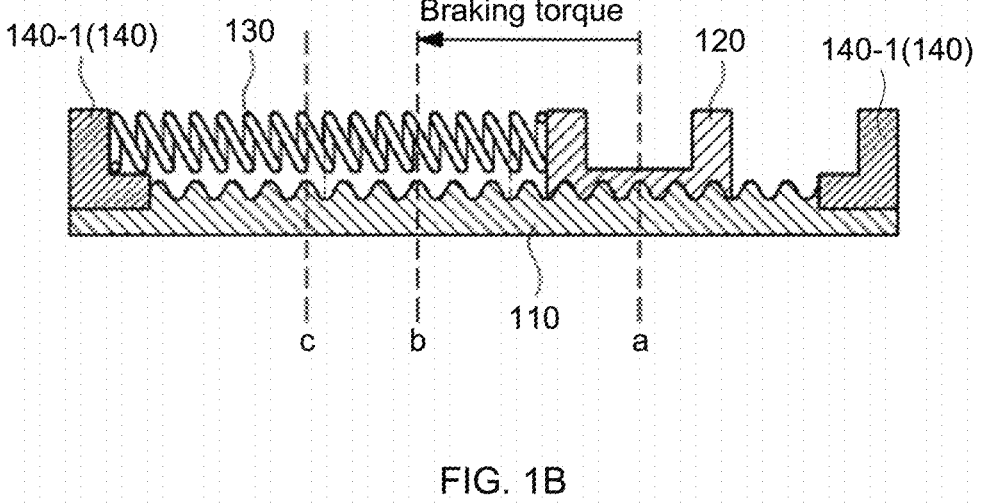

FIGS. 1A and 1B are views for explaining the stopper.

As illustrated in FIGS. 1A and 1B, the stopper may be installed in a steering input actuator. A lead screw 110, a nut 120, and elastic members 130 may be positioned in the stopper.

The lead screw 110 may rotate as a steering wheel rotates. The nut 120 may be mounted on a screw thread formed on an outer diameter of the lead screw 110. Therefore, the lead screw 110 rotates as the steering wheel rotates. When the lead screw 110 rotates, the nut 120 may rectilinearly move by means of the screw thread. That is, the nut 120 may move in a direction of a rotation axis in conjunction with the rotation of the steering wheel depending on the rotation direction of the steering wheel.

The elastic members 130 may be positioned on the movement route of the nut 120 and provide the reaction force (the tensile force, the compressive force, and the restoring force) to the rotation of the steering wheel by receiving the external force from the nut 120 while the nut 120 moves.

In the embodiment, the elastic members 130 may include an elastic member 130-1 positioned at a left side (based on FIGS. 1A and 1B) of the nut 120 in the direction of the rotation axis, and an elastic member 130-2 positioned at a right side (based on FIGS. 1A and 1B) of the nut 120.

Any elastic member may be used as the elastic member 130 according to the present disclosure as long as the elastic member may provide the tensile force or compressive force and provide the restoring force in a direction opposite to the direction in which the nut 120 moves. For example, the elastic member 130 may be implemented as a spring.

The steering of the vehicle has a limitation in angle for implementing the steering, and the steering wheel may rotate to a limit angle that may be implemented by the vehicle. To this end, dampers 140 may be provided at two opposite ends of the nut 120 and prevent the nut 120 from moving any further.

Even though the steering wheel continuously rotates in one direction, the movement of the nut 120, which moves in conjunction with the rotation of the steering wheel, is restricted by the dampers 140, such that the limit angle of the steering wheel may be implemented.

In the embodiment, the dampers 140 may include a damper 140-1 positioned at the left side (based on FIGS. 1A and 1B) of the nut 120 in the direction of the rotation axis, and a damper 140-2 positioned at the right side (based on FIGS. 1A and 1B) of the nut 120.

When the tensile force or the compressive force is applied to the nut 120 by the elastic member 130, the tensile force or the compressive force may not be eliminated when the nut 120 reaches a neutral position. For this reason, in this case, overshooting may occur in which the nut 120 deviates from the neutral position and reaches position a as the residual tensile force or the residual compressive force is continuously applied to the nut 120 by the elastic member 130 even after the nut 120 reaches the neutral position.

The overshooting may be prevented or minimized by the braking torque generated by the reaction force motor. Specifically, the overshooting may be prevented or minimized as the residual tensile force or the residual compressive force generated by the elastic member 130 is offset against the braking torque generated by the reaction force motor.

However, underdamping may occur in which the nut 120 cannot reach position b but remains at position c when a magnitude of the braking torque, which is generated to minimize or prevent the overshooting, is excessively large.

The underdamping may be prevented or minimized by the braking torque generated by the reaction force motor. Specifically, the underdamping may be prevented or minimized as the braking torque generated by the reaction force motor tunes the tensile force or the compressive force of the elastic member 130 to allow the nut 120 to reach position b.

Hereinafter, an apparatus 200 for controlling an operation of the reaction force motor (hereinafter, referred to as a 'control apparatus') will be described.

Figure 2:
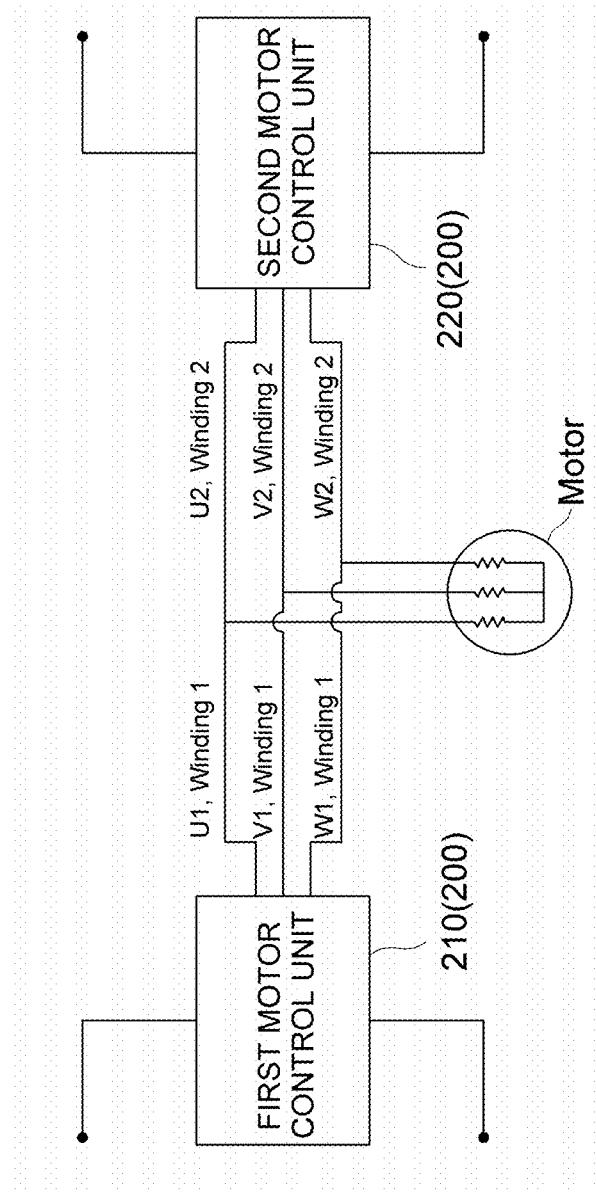
FIG. 2 is an exemplary block diagram illustrating an apparatus for controlling an operation of a reaction force motor.
Figure 3:
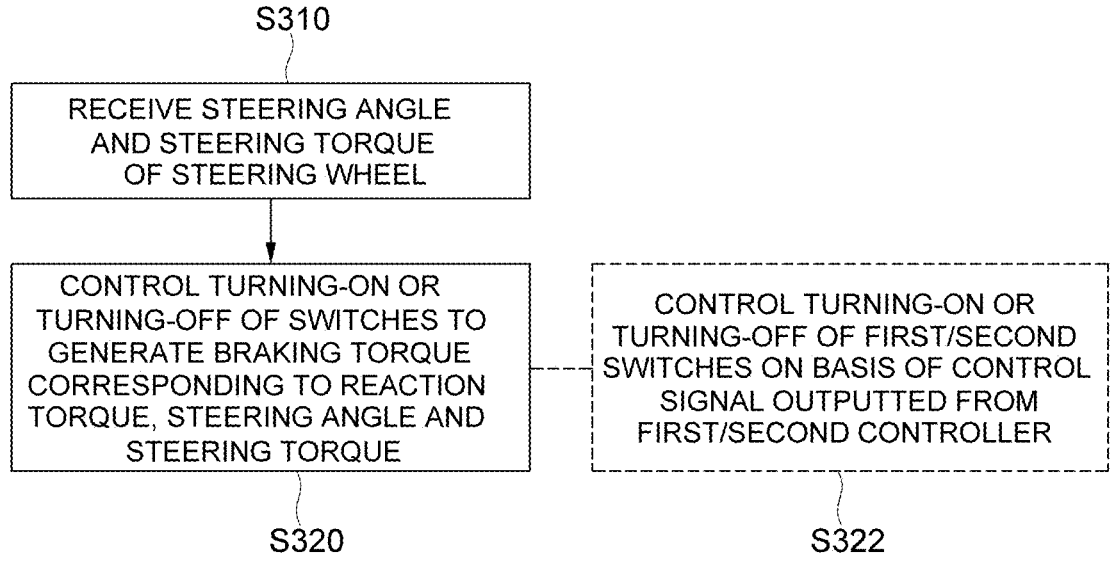
FIG. 3 is a flowchart for explaining a method of controlling the operation of the reaction force motor.

FIG. 2 is an exemplary block diagram illustrating the control apparatus 200, and FIG. 3 is a flowchart for explaining a method of controlling the operation of the reaction force motor (hereinafter, referred to as a 'control method').

As illustrated in FIG. 2, the control apparatus 200 may include a first motor control unit 210 and a second motor control unit 220.

The reaction force motor may be a dual wound rotor motor designed to have a structure (a first winding part and a second winding part) capable of performing two pairs of different multi-phase inputs as an input of the motor by bisecting a single motor.

The first and second motor control units 210 and 220 may be implemented by an electronic control unit (ECU) and include one or more processors (controllers), memories, and I/O interfaces. In addition, the first and second motor control units 210 and 220 may communicate with each other for controlling turning-on and turning-off of switches to be described below.

The first and second motor control units 210 and 220 may receive a steering angle and steering torque of the steering wheel from a steering angle sensor (not illustrated) and a steering torque sensor (not illustrated) (S310).

The first motor control unit 210 may be connected to the reaction force motor through a first winding part (Winding 1). In addition, the first motor control unit 210 may turn on or off current paths formed by the first motor control unit 210 and the reaction force motor by controlling the switches included in the first motor control unit 210 (S320).

The second motor control unit 220 may be connected to the reaction force motor through a second winding part (Winding 2). In addition, the second motor control unit 220 may turn on or off current paths formed between the second motor control unit 220 and the reaction force motor by controlling the switches included in the second motor control unit 220 (S320).

The braking torque may be generated by the reaction force motor by means of the switching control performed by the first and second motor control units 210 and 220. Specifically, as the first and second motor control units 210 and 220 perform the switching control, the reaction force motor may generate the braking torque corresponding to the steering angle and the steering torque of the steering wheel and the reaction force torque generated by the elastic member.

The one or more switches may be controlled to be turned on or off by the switching control of the first and second motor control units 210 and 220. For example, among the three switches (three switches respectively connected to three phases) included in the first motor control unit 210, any one switch, two switches, and all the switches may be turned on. In addition, among the three switches (three switches respectively connected to three phases) included in the second motor control unit 220, any one switch, two switches, and all the switches may also be turned on.

However, the configuration in which all the three switches are turned on to generate the braking torque generates relatively smaller fluctuation than the configuration in which any one switch is turned on to generate the braking torque and the configuration in which the two switches are turned on to generate the braking torque.

When the braking torque having the small fluctuation acts as the reaction force, a stable reaction force is applied to the steering wheel, which makes it possible to improve steering operability. Therefore, the present disclosure will be described, focusing on the example in which all the switches are turned on to generate the braking torque.

As described above, the control apparatus 200 according to the present disclosure has a redundant circuit structure in which the first and second motor control units 210 and 220 are respectively connected in parallel to the winding parts of the reaction force motor.

Therefore, according to the present disclosure, circulating current is increased as trace resistance between the reaction force motor and the first and second motor control units 210 and 220 and resistance of the switches are reduced by half in comparison with a control apparatus in the related art in which a single motor control unit is connected to a winding part of a single wound rotor reaction force motor. As a result, according to the present disclosure, it is possible to generate the further increased braking torque compared to the control apparatus in the related art.

According to the present disclosure, the current path controlled by the first motor control unit 210 and the current path controlled by the second motor control unit 220 are spaced apart from each other. Therefore, it is possible to prevent heat from being repeatedly generated at a narrow position by the circulating current, thereby reducing a current load and increasing a heat capacity (i.e., an operation cycle).

According to the present disclosure, one or more of the plurality of current paths may be used to generate the braking torque. Therefore, it is possible to generate the braking torque even though a failure may occur on the system (the system for providing the reaction force by using the stopper and the reaction force motor). Therefore, the present disclosure provides a structure robust against the failure.

Figure 4:
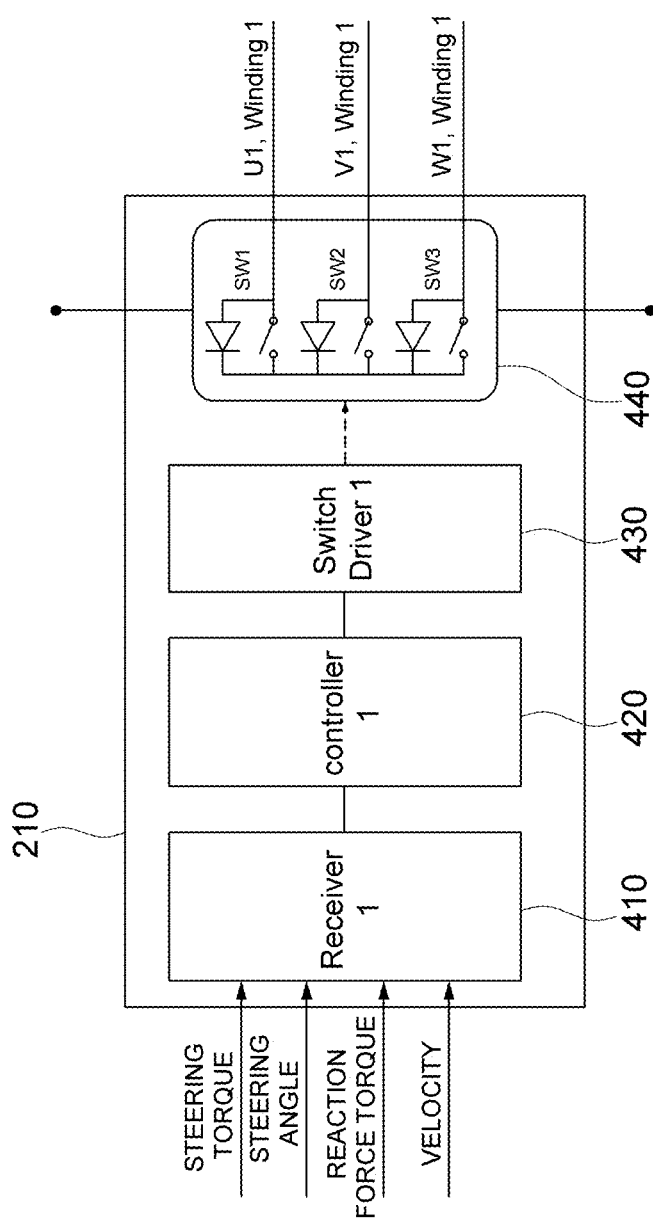
FIG. 4 is an exemplary block diagram illustrating a first motor control unit.
Figure 5:
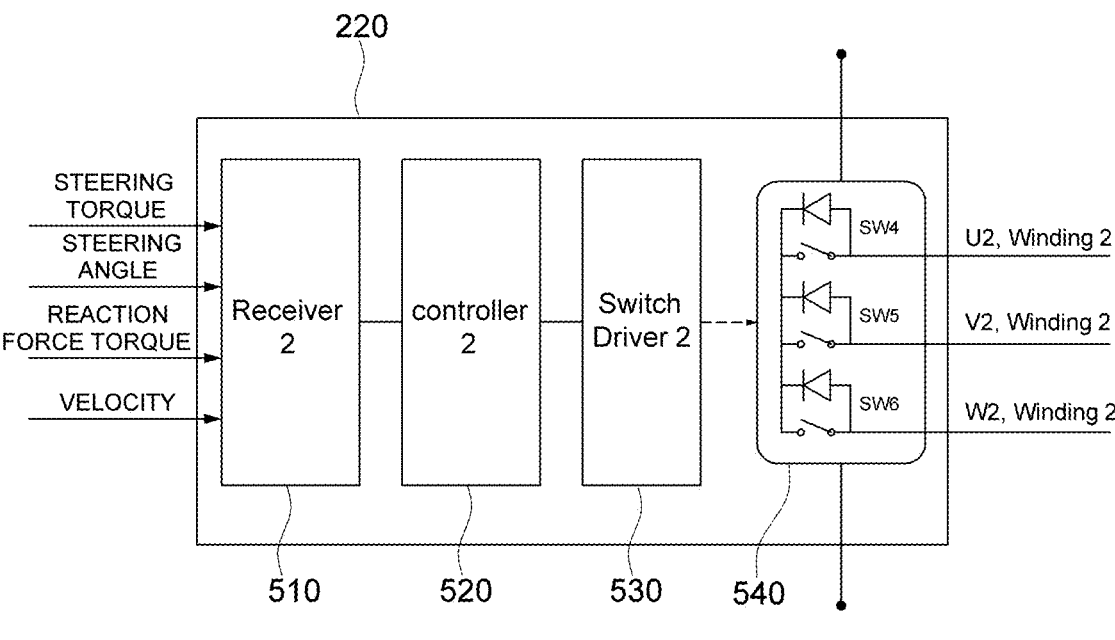
FIG. 5 is an exemplary block diagram illustrating a second motor control unit.

FIG. 4 is an exemplary block diagram illustrating the first motor control unit 210, and FIG. 5 is an exemplary block diagram illustrating the second motor control unit 220.

As illustrated in FIG. 4, the first motor control unit 210 may include a first receiver 410 (Receiver 1), a first controller 420, a first switch driver 430, and a first inverter 440.

The first receiver 410 may receive the steering angle and steering torque of the steering wheel from the steering angle sensor and the steering torque sensor. In addition, the first receiver 410 may receive the reaction force torque generated by the elastic member.

The first controller 420 may calculate the braking torque corresponding to the steering angle, the steering torque, and the reaction force torque and output a control signal (first reaction force control signal) so that the reaction force motor generates the calculated braking torque.

The first switch driver 430 may receive the first reaction force control signal and control the first inverter 440 so that a switching operation corresponding to the first reaction force control signal is performed. The first inverter 440 may include switches connected to respective phases (e.g., a first phase U1, a second phase V1, and a third phase W1) of the first winding part (Winding 1).

The switches may form the current paths by being turned on or off on the basis of a first path control signal outputted from the first switch driver 430 (S322). The switches SW1 to SW3 may be implemented as field effect transistors (FETs).

As illustrated in FIG. 5, the second motor control unit 220 may include a second receiver 510 (Receiver 2), a second controller 520, a second switch driver 530, and a second inverter 540.

The second receiver 510 may receive the steering angle and steering torque of the steering wheel from the steering angle sensor and the steering torque sensor. In addition, the second receiver 510 may receive the reaction force torque generated by the elastic member.

The second controller 520 may calculate the braking torque corresponding to the steering angle, the steering torque, and the reaction force torque and output a control signal (second reaction force control signal) so that the reaction force motor generates the calculated braking torque.

The second switch driver 530 may receive the second reaction force control signal and control the second inverter 540 so that a switching operation corresponding to the second reaction force control signal is performed. The second inverter 540 may include switches connected to respective phases (e.g., a first phase U2, a second phase V2, and a third phase W2) of the second winding part (Winding 2).

The switches may form the current paths by being turned on or off on the basis of a second path control signal outputted from the second switch driver 530 (S322). The switches SW4 to SW6 may be implemented as field effect transistors (FETs).

Hereinafter, a method of generating the braking torque when a failure occurs on the system (the system for providing the reaction force by using the stopper and the reaction force motor will be described.

The failure may include 1) a case (open failure) in which any one of the phases of the first winding part (Winding 1) and the phases of the second winding part (Winding 2) is open-circuited, 2) a case (short failure 1) in which any one of the phases of the first winding part (Winding 1) and the phases of the second winding part (Winding 2) is short-circuited, and 2) a case (short failure 2) in which two or more of the phases of the first winding part (Winding 1) and the phases of the second winding part (Winding 2) are short-circuited.

Figure 6:
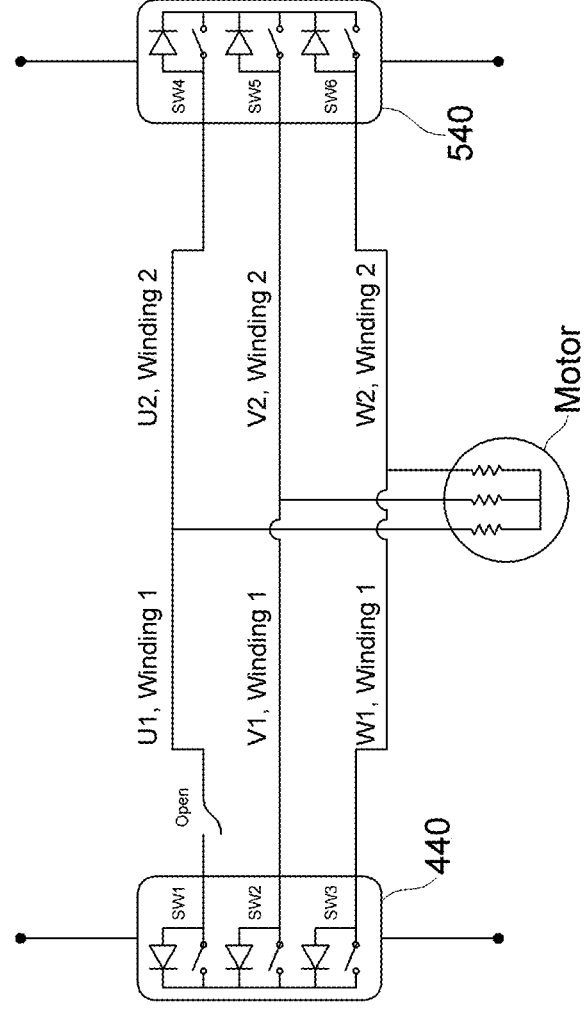
FIG. 6 is a block diagram for explaining a method of controlling an operation of the motor in the event of a phase open circuit.
Figure 7:
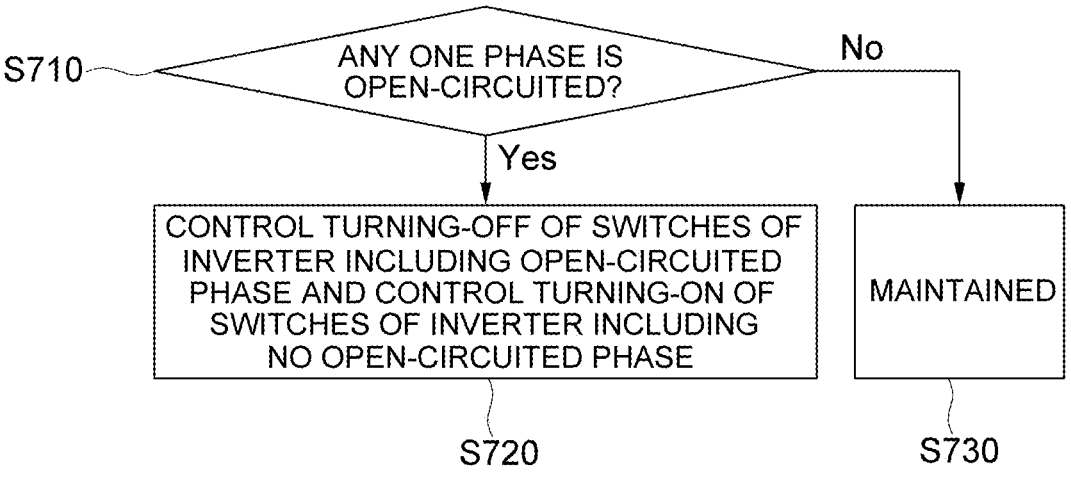
FIG. 7 is a flowchart for explaining the method of controlling the operation of the motor in the event of the phase open circuit.

1) FIG. 6 is a block diagram for explaining the method of generating the braking torque in the event of the open failure, and FIG. 7 is a flowchart for explaining the method of generating the braking torque.

The first and second motor control units 210 and 220 may determine whether the open failure occurs (S710).

The control of the turning-on or turning-off of the switches may not be performed when the open failure does not occur (S730). In contrast, when the open failure occurs, the first and second motor control units 210 and 220 may control the turning-off of the switches of the winding part including the phase on which the open failure occurs, and the first and second motor control units 210 and 220 may control the turning-on of the switches of the winding part including the phase on which the open failure does not occur (S720).

Since only the switches of the winding part including the phase, on which the open failure does not occur, are turned on, the current circulates only through the winding part including the phase on which the open failure does not occur. Therefore, the braking torque is generated only through the winding part including the phase on which the open failure does not occur.

For example, as illustrated in FIG. 6, when any one phase U1 is open-circuited among the phases of the first winding part (Winding 1), the first switch driver 430 may control the turning-off of the first switches SW1 to SW3, and the second switch driver 530 may control the turning-on of the second switches SW4 to SW6.

Since only the second switches SW4 to SW6 are turned on, the current circulates only through the second winding part (Winding 2), and the braking torque is generated by the current circulating through the second winding part (Winding 2).

Figure 8:
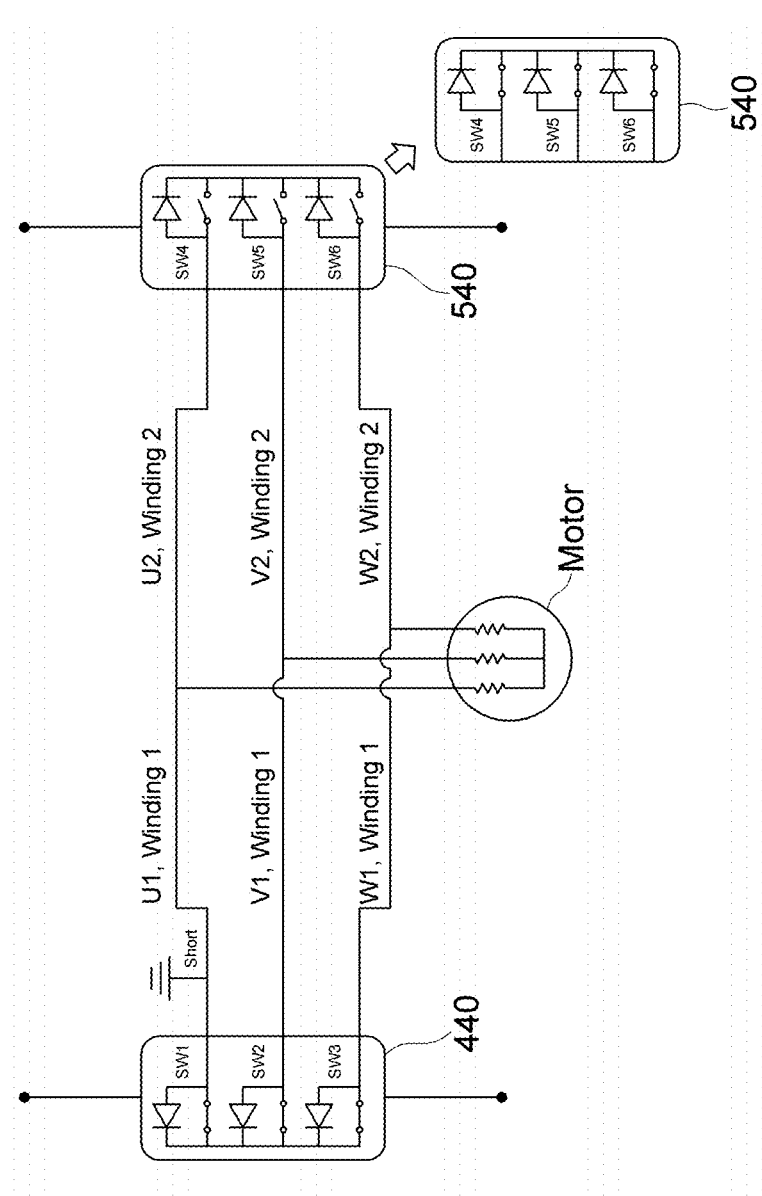
FIG. 8 is a block diagram for explaining the method of controlling the operation of the motor in the event of a phase short circuit.
Figure 9:
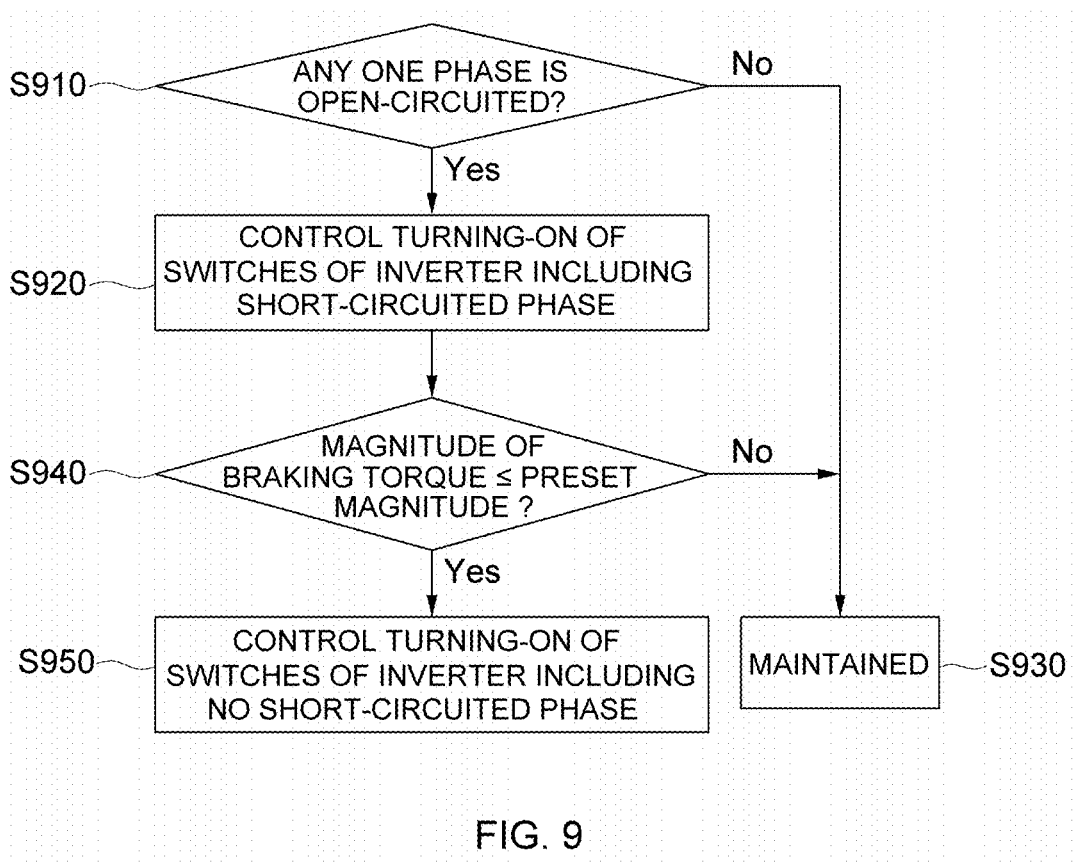
FIG. 9 is a flowchart for explaining the method of controlling the operation of the motor in the event of the phase short circuit.

2) FIG. 8 is a block diagram for explaining the method of generating the braking torque in the event of short failure 1, and FIG. 9 is a flowchart for explaining the method of generating the braking torque.

The first and second motor control units 210 and 220 may determine whether short failure 1 occurs (S910).

The control of the turning-on or turning-off of the switches may not be performed when short failure 1 does not occur (S930). In contrast, when short failure 1 occurs, the first and second motor control units 210 and 220 may control the turning-on of the switches of the winding part including the phase on which short failure 1 occurs (S920).

Since the current circulates through the winding part including the phase on which short failure 1 occurs, the braking torque is also generated through the winding part including the phase on which short failure 1 occurs.

For example, as illustrated in FIG. 8, when any one phase U1 is short-circuited among the phases of the first winding part (Winding 1), the first switch driver 430 may control the turning-on of the first switches SW1 to SW3.

Since the first switches SW1 to SW3 are turned on, the current circulates through the first winding part (Winding 1), and the braking torque is generated by the current circulating through the first winding part (Winding 1).

Meanwhile, the first and second motor control units 210 and 220 may be configured to generate additional braking torque by using switches of another winding part when the braking torque, which is generated by the reaction force motor through the switching control in the situation in which short failure 1 occurs is equal to or lower than a preset magnitude (the braking torque is insufficient).

To this end, the first and second motor control units 210 and 220 may determine whether the braking torque generated through the switching control is equal to or lower than the preset magnitude (S940).

The additional turning-on control may not be performed on the switches when the braking torque exceeds the preset magnitude (S930). In contrast, when the braking torque is equal to or lower than the preset magnitude, the first and second motor control units 210 and 220 may control the turning-on of the switches of the winding part including the phase on which short failure 1 does not occur (S950).

Since the current circulates even through the winding part including the phase on which short failure 1 does not occur, the additional braking torque is generated through the winding part including the phase on which short failure 1 does not occur.

For example, as illustrated in FIG. 8, the second switch driver 530 may control the turning-on of the second switches SW4 to SW6 when the braking torque is equal to or lower than the preset magnitude.

Since the second switches SW4 to SW6 are turned on, the current circulates through the second winding part (Winding 2), and the additional braking torque is generated by the current circulating through the second winding part (Winding 2).

Figure 10:
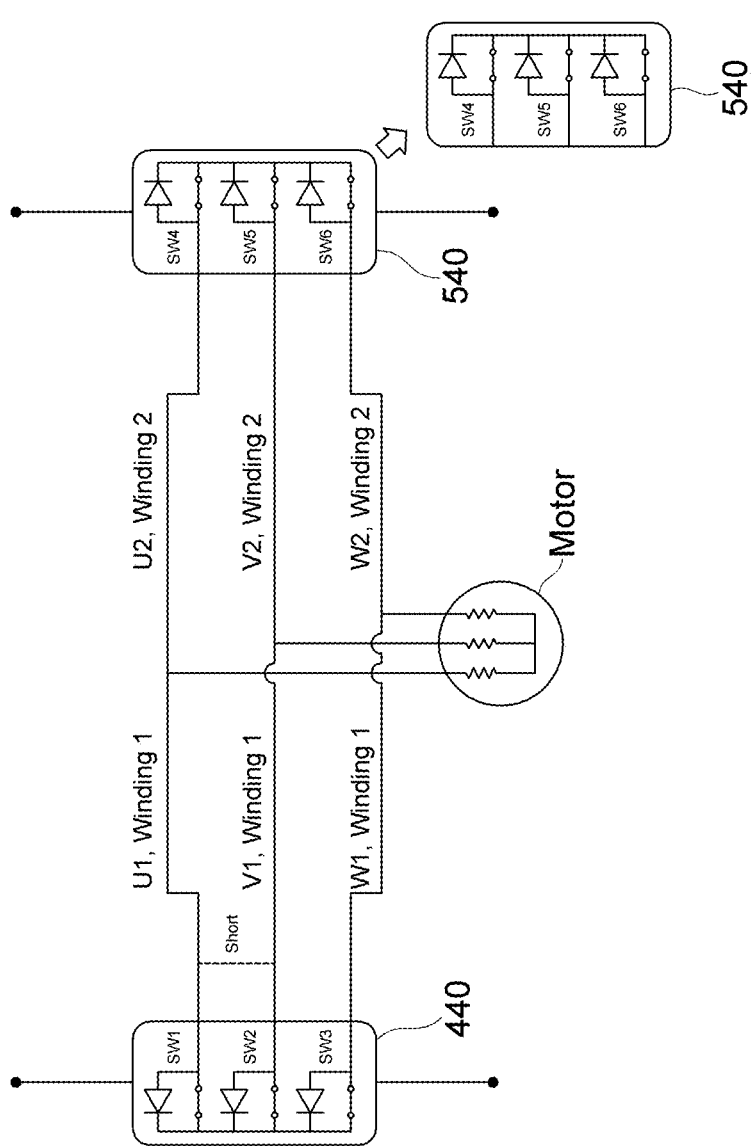
FIG. 10 is a block diagram for explaining the method of controlling the operation of the motor in the event of a short circuit between the phases.
Figure 11:
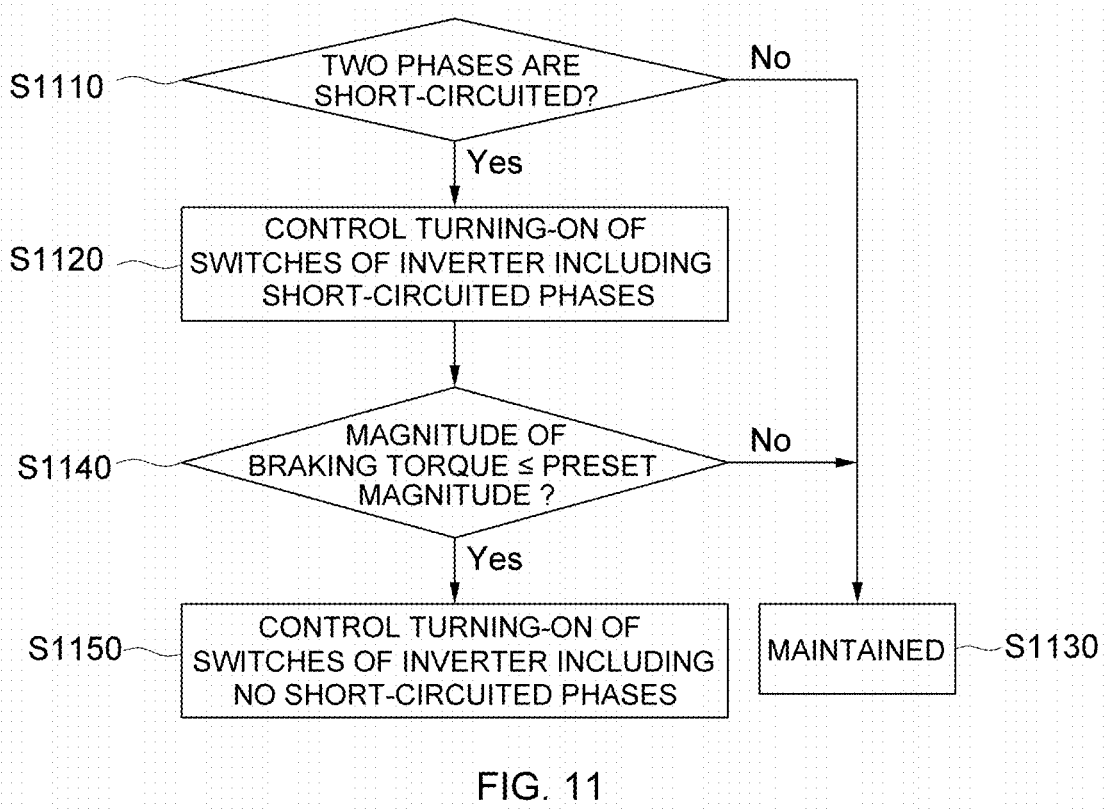
FIG. 11 is a flowchart for explaining the method of controlling the operation of the motor in the event of the short circuit between the phases.

3) FIG. 10 is a block diagram for explaining the method of generating the braking torque in the event of short failure 2, and FIG. 11 is a flowchart for explaining the method of generating the braking torque.

The first and second motor control units 210 and 220 may determine whether short failure 2 occurs (S1110).

The control of the turning-on or turning-off of the switches may not be performed when short failure 2 does not occur (S1130). In contrast, when short failure 2 occurs, the first and second motor control units 210 and 220 may control the turning-on of the switches of the winding part including the phase on which short failure 2 occurs (S1120).

Since the current circulates through the winding part including the phase on which short failure 2 occurs, the braking torque is also generated through the winding part including the phase on which short failure 2 occurs.

For example, as illustrated in FIG. 10, the first switch driver 430 may control the turning-on of the first switches SW1 to SW3 when the two phases U1 and V1 among the phases of the first winding part (Winding 1) are short-circuited.

Since the first switches SW1 to SW3 are turned on, the current circulates through the first winding part (Winding 1), and the braking torque is generated by the current circulating through the first winding part (Winding 1).

Meanwhile, the first and second motor control units 210 and 220 may be configured to generate additional braking torque by using switches of another winding part when the braking torque, which is generated by the reaction force motor through the switching control in the situation in which short failure 2 occurs is equal to or lower than the preset magnitude (the braking torque is insufficient).

To this end, the first and second motor control units 210 and 220 may determine whether the braking torque generated through the switching control is equal to or lower than the preset magnitude (S1140).

The additional turning-on control may not be performed on the switches when the braking torque exceeds the preset magnitude (S1130). In contrast, when the braking torque is equal to or lower than the preset magnitude, the first and second motor control units 210 and 220 may control the turning-on of the switches of the winding part including the phase on which short failure 2 does not occur (S1150).

Since the current circulates even through the winding part including the phase on which short failure 2 does not occur, the additional braking torque is generated through the winding part including the phase on which short failure 2 does not occur.

For example, as illustrated in FIG. 10, the second switch driver 530 may control the turning-on of the second switches SW4 to SW6 when the braking torque is equal to or lower than the preset magnitude.

Since the second switches SW4 to SW6 are turned on, the current circulates through the second winding part (Winding 2), and the additional braking torque is generated by the current circulating through the second winding part (Winding 2).

Hereinafter, a method of generating braking torque by adjusting a duty ratio by the switches will be described.

Figure 12:
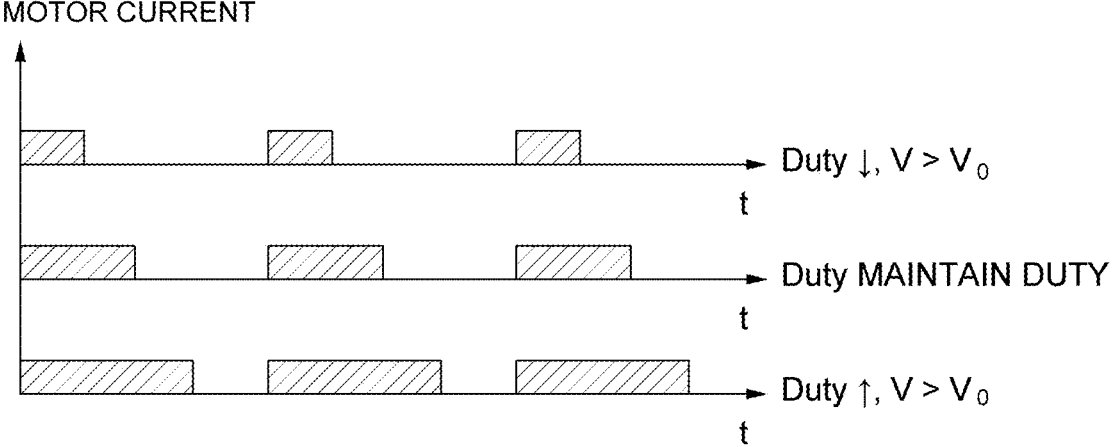
FIG. 12 is an exemplified view for explaining the adjustment of a duty ratio.
Figure 13:
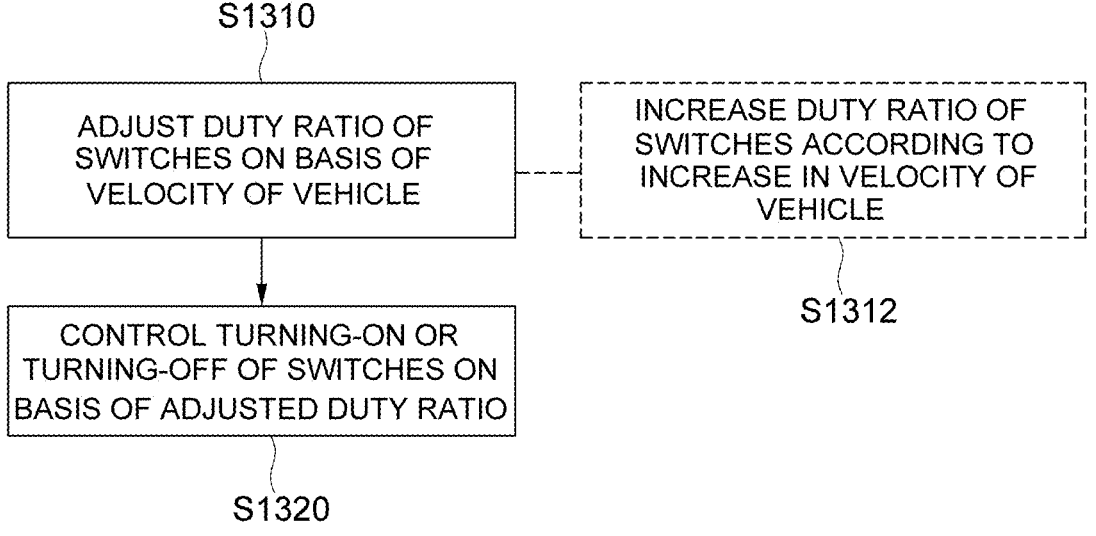
FIG. 13 is a flowchart for explaining a method of adjusting the duty ratio.
Figure 14:
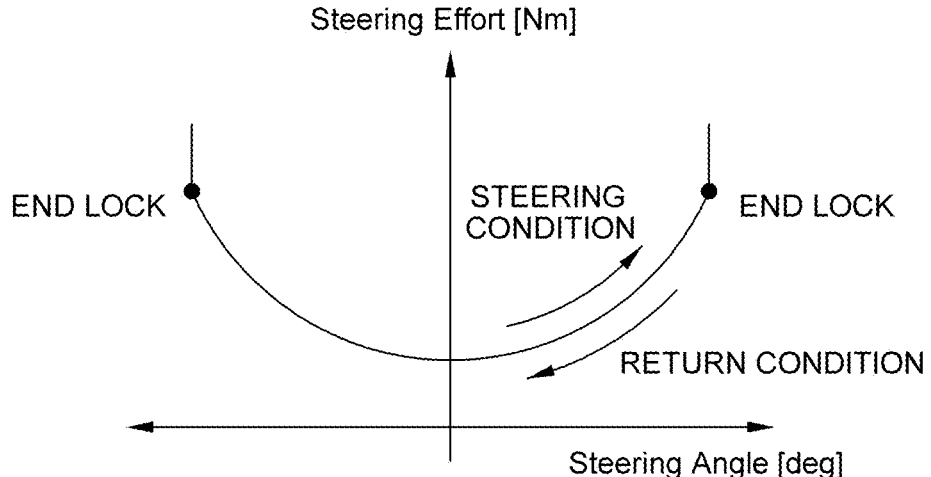
FIG. 14 is an exemplified view for explaining a steering condition and a return condition.

FIG. 12 is an exemplified view for explaining an example of the adjustment of the duty ratio, FIG. 13 is a flowchart for explaining the method of adjusting the duty ratio, and FIG. 14 is an exemplified view for explaining a steering condition and a return condition.

The first and second receivers 310 and 510 may further receive a velocity of the vehicle from a vehicle velocity sensor (FIGS. 3 and 5).

The first and second motor control units 210 and 220 may adjust the duty ratio of the reaction force motor on the basis of the velocity of the vehicle (S1310). That is, the first and second motor control units 210 and 220 may increase the duty ratio of the switches as the velocity of the vehicle increases. The first and second motor control units 210 and 220 may decrease the duty ratio of the switches as the velocity of the vehicle decreases (S1312). In addition, the first and second motor control units 210 and 220 may control the turning-on or turning-off of the switches on the basis of the adjusted duty ratio (S1320).

Referring to FIG. 12, when the velocity of the vehicle exceeds a predetermined velocity (V>V$_0$), the first and second motor control units 210 and 220 may adjust the duty ratio to a duty ratio higher than a preset duty ratio at the predetermined velocity. In this case, the reaction force motor may generate relatively high braking torque.

On the contrary, when the velocity of the vehicle is lower than the predetermined velocity (V<V0), the first and second motor control units 210 and 220 may adjust the duty ratio to a duty ratio lower than the preset duty ratio at the predetermined velocity. In this case, the reaction force motor may generate relatively low braking torque.

Meanwhile, the first and second motor control units 210 and 220 may determine whether the steering wheel is steered on the basis of the steering angle and steering torque, and the first and second motor control units 210 and 220 may generate the braking torque on the basis of whether the steering wheel is steered.

Referring to FIG. 14, the steering condition may generally mean that the steering wheel is controlled and moved to two opposite ends of a rack. That is, the steering condition may mean that the steering wheel moves in a direction in which an absolute value of the steering angle of the steering wheel increases.

On the contrary, a return condition may mean that the steering wheel is controlled and moved to a middle portion of the rack. That is, the return condition may mean that the steering wheel moves in a direction in which an absolute value of the steering angle of the steering wheel decreases.

Since the steering torque, which is required to control the steering wheel, increases as the steering angle of the steering wheel increases (or, as the steering angle of the steering wheel decreases in a case in which the steering angle is less than 0), a value of the steering torque may be small or zero in a situation in which the steering angle returns to zero.

In consideration of this situation, the first and second motor control units 210 and 220 may determine that the current condition is the steering condition when the steering angle is changed and the steering torque value is detected. The first and second motor control units 210 and 220 may determine the return condition when the steering angle is changed and the steering torque value is not detected.

In this case, the first and second motor control units 210 and 220 may generate the braking torque with a relatively small value or may not generate the braking torque in the steering condition and generate the braking torque in the return condition.

In another embodiment, the first and second motor control units 210 and 220 may determine whether the steering wheel is steered on the basis of the steering angle and a steering angular velocity. The first and second motor control units 210 and 220 may generate the braking torque on the basis of whether the steering wheel is steered.

The first and second motor control units 210 and 220 may determine that the current condition is the steering condition when the steering wheel is positioned at the steering angle defined in the clockwise direction and the steering angular velocity is defined in the clockwise direction and when the steering wheel is positioned at the steering angle defined in the counterclockwise direction and the steering angular velocity is defined in the counterclockwise direction based on the neutral position of the steering wheel.

The first and second motor control units 210 and 220 may not generate the braking torque when the first and second motor control units 210 and 220 determine that the velocity of the vehicle is lower than the preset velocity in the steering condition. In addition, the first and second motor control units 210 and 220 may generate the braking torque when the velocity of the vehicle is higher than the preset velocity in the steering condition.

The first and second motor control units 210 and 220 may determine that the current condition is the return condition when the steering wheel is positioned at the steering angle defined in the clockwise direction and the steering angular velocity is defined in the counterclockwise direction and when the steering wheel is positioned at the steering angle defined in the counterclockwise direction and the steering angular velocity is defined in the clockwise direction based on the neutral position of the steering wheel.

When the velocity of the vehicle is lower than the preset velocity in the return condition, the first and second motor control units 210 and 220 may generate the braking torque and adjust the duty ratio to a duty ratio lower than the duty ratio corresponding to the preset velocity. That is, the first and second motor control units 210 and 220 may adjust the duty ratio to a duty ratio corresponding to a low velocity of the vehicle.

On the contrary, when the velocity of the vehicle is higher than the preset velocity in the return condition, the first and second motor control units 210 and 220 may generate the braking torque and set the duty ratio to a duty ratio corresponding to the above-mentioned velocity.

FIGS. 3, 7, 9, 12, and 13 illustrate that the steps are sequentially performed, but this illustration is given to exemplarily describe the technical spirit of the embodiment of the present disclosure. In other words, various modifications and deformations may be made by performing the steps while changing the order illustrated in FIGS. 3, 7, 9, 12, and 13 or performing one or more of the steps in parallel by those skilled in the art without departing from the intrinsic characteristics of the embodiment of the present disclosure. Accordingly, the present disclosure is not limited to the time sequence illustrated in FIGS. 3, 7, 9, 12, and 13.

The above description is simply given for illustratively describing the technical spirit of the present embodiment, and those skilled in the art to which the present embodiment pertains will appreciate that various changes and modifications are possible without departing from the essential characteristic of the present embodiment. Therefore, the embodiments are provided for illustrative purposes only but not intended to limit the technical concept of the present embodiment. The scope of the technical concept of the present embodiment is not limited thereto. The protective scope of the present embodiment should be construed based on the following claims, and all the technical spirit in the equivalent scope thereto should be construed as falling within the scope of the present embodiment.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for controlling an operation of a reaction force motor having multi-phases and included in a system for providing a reaction force by using the reaction force motor and an elastic member which is deformed by a rotation of a steering wheel in a direction of a rotation axis of the steering wheel, the apparatus comprising:

a first motor control unit connected to multi-phases of a first winding part of the reaction force motor; and a second motor control unit connected to multi-phases of a second winding part of the reaction force motor, wherein each of the multi-phases of the first winding part and each of the multi-phases of the second winding part are connected to each of multi-phases of the reaction force motor, wherein the first and second motor control units receive a steering angle and a steering torque of the steering wheel from a steering angle sensor and a steering torque sensor, and wherein the first and second motor control units calculate a torque for the reaction force motor based on a reaction force torque associated with the deformation of the elastic member, the steering angle of the steering wheel received by the steering angle sensor, and the steering torque of the steering wheel received from the steering torque sensor, and control turning-on or turning-off of switches included therein so that the reaction force motor generates the torque corresponding to the calculated torque, wherein the first and second motor control units are configured such that, when a fault occurs in one of the motor control units, another of the motor control units continues to control the reaction force motor, wherein when any one of the multi-phases of the first winding part is open-circuited, a first switch driver of the first motor control unit is programmed to turn off first switches included in the first motor control unit, and a second switch driver of the second motor control unit is programmed to turn on second switches included in the second motor control unit, and wherein when any one of the multi-phases of the first winding part is short-circuited or when a short circuit occurs between the multi-phases of the first winding part, the first switch driver is programmed to turn on the first switches, and when a magnitude of the torque generated by the reaction force motor is equal to or smaller than a preset magnitude, the second switch driver is programmed to turn on the second switches.

2. The apparatus of claim 1, wherein the first motor control unit comprises:

a first controller;

the first switch driver; and a first inverter including the first switches connected to the multi-phases of the first winding part, respectively, and wherein the first switch driver controls the turning-on or turning-off of the first switches on the basis of a control signal outputted from the first controller.

3. The apparatus of claim 2, wherein the second motor control unit comprises:

a second controller;

the second switch driver; and a second inverter including the second switches connected to the multi-phases of the second winding part, respectively, and wherein the second switch driver controls the turning-on or turning-off of the second switches on the basis of a control signal outputted from the second controller.

4. The apparatus of claim 3, wherein when a short circuit occurs between the multi-phases of the first winding part, the first switch driver controls the turning-on of the first switches.

5. The apparatus of claim 4, wherein when a magnitude of the torque generated by the reaction force motor is equal to or smaller than a preset magnitude, the second switch driver controls the turning-on of the second switches.

6. The apparatus of claim 1, wherein the motor control unit adjusts a duty ratio of the switches on the basis of a velocity of a vehicle.

7. The apparatus of claim 6, wherein the motor control unit increases the duty ratio of the switches according to an increase in velocity.

8. A method performed by an apparatus for controlling an operation of a reaction force motor, which is included in a system for providing a reaction force by using the reaction force motor and an elastic member which is deformed by a rotation of a steering wheel in a direction of a rotation axis of the steering wheel, the apparatus comprising a first motor control unit connected to multi-phases of a first winding part of the reaction force motor, and a second motor control unit connected to multi-phases of a second winding part of the reaction force motor, wherein each of the multi-phases of the first winding part and each of the multi-phases of the second winding part are connected to each of multi-phases of the reaction force motor, the method comprising:

receiving a steering angle and steering torque of the steering wheel from a steering angle sensor and a steering torque sensor;

calculate a torque for the reaction force motor based on a reaction force torque associated with the deformation of the elastic member, the steering angle of the steering wheel received by the steering angle sensor, and the steering torque of the steering wheel received from the steering torque sensor; and controlling turning-on or turning-off of switches included in the first and second motor control units so that the reaction force motor generates the torque corresponding to the calculated torque, wherein the first and second motor control units are configured such that, when a fault occurs in one of the motor control units another of the motor control units continues to control the reaction force motor, and wherein the controlling of the turning-on or turning-off of the switches comprises:

when any one of the multi-phases of the first winding part is open-circuited, by a first switch driver of the first motor control unit, turning off first switches included in the first motor control unit and, by a second switch driver of the second motor control unit, turning on second switches included in the second motor control unit; and when any one of the multi-phases of the first winding part is short-circuited, by the first switch driver, turning on the first switches, and when a magnitude of the torque generated by the reaction force motor is equal to or smaller than a preset magnitude, by the second switch driver, turning on the second switches.

9. The method of claim 8, wherein the first motor control unit comprises a first controller, the first switch driver, and a first inverter including the first switches connected to the multi-phases of the first winding part, and in the controlling of the turning-on or turning-off of the switches, the first switch driver controls the turning-on or turning-off of the first switches on the basis of a control signal outputted from the first controller.

10. The method of claim 9, wherein the second motor control unit comprises a second controller, the second switch driver, and a second inverter including the second switches connected to the multi-phases of the second winding part, and in the controlling of the turning-on or turning-off of the switches, the second switch driver controls the turning-on or turning-off of the second switches on the basis of a control signal outputted from the second controller.

11. The method of claim 10, wherein in the controlling of the turning-on or turning-off of the switches, the first switch driver controls the turning-on of the first switches when a short circuit occurs between the multi-phases of the first winding part.

12. The method of claim 11, wherein in the controlling of the turning-on or turning-off of the switches, the second switch driver controls the turning-on of the second switches when a magnitude of the torque generated by the reaction force motor is equal to or smaller than a preset magnitude.

13. The method of claim 8, wherein the controlling of the turning-on or turning-off of the switches comprises:

adjusting a duty ratio of the switches on the basis of a velocity of a vehicle; and controlling the turning-on or turning-off of the switches on the basis of the adjusted duty ratio.

14. The method of claim 13, wherein the adjusting of the duty ratio comprises increasing the duty ratio of the switches according to an increase in velocity.

* * * * *